United States Patent [19]
Kiisk

[11] 3,710,331
[45] Jan. 9, 1973

[54] RANGE CHANGE METHOD OF DETERMINING POSITIONS

[76] Inventor: Allan Kiisk, 9215 Presidential Drive, Alexandria, Va. 22309

[22] Filed: April 8, 1971

[21] Appl. No.: 132,458

[52] U.S. Cl............................343/112 R, 235/150.27
[51] Int. Cl..............................G01s 5/02, G01s 5/14
[58] Field of Search.343/112 R, 112 TC; 235/150.27

[56] References Cited

UNITED STATES PATENTS 3,242,494   3/1966   Gicca..................................343/112 R
3,286,263   11/1966   Hammack..........................343/112 R

*Primary Examiner*—Samuel Feinberg
*Assistant Examiner*—Richard E. Berger
*Attorney*—Charles K. Wright, Jr., William G. Gapcynski and Lawrence A. Neureither

[57] ABSTRACT

A method and apparatus for determining coordinates of unknown ground positions and positions of objects above the earth's surface by the use of code-modulated radio signals in conjunction with stable oscillators. An aircraft transmits a signal which is acquired and tracked by known and unknown ground stations. Range changes are obtained from the measurements of the phase shift between the received signal and an internal reference signal. From the large number of range change measurements obtained as the aircraft moves with respect to the ground positions, the positions of the aircraft as well as the positions of the unknown points are computed by solving large groups of equations simultaneously.

20 Claims, 5 Drawing Figures

PATENTED JAN 9 1973

INVENTOR.
ALLAN KIISK
BY Charles K Wright Jr.
ATTORNEY

INVENTOR.
ALLAN KIISK
BY Charles K Whight Jr.
ATTORNEY

RANGE CHANGE METHOD OF DETERMINING POSITIONS

The invention described herein may be manufactured and used by or for the U.S. Government for governmental purposes without the payment to me of any royalty thereon.

BACKGROUND OF THE INVENTION

1. Field of the Invention

The Range Change Method is a new concept and technique for determining unknown positions on the ground and in the air by the use of radio transmissions. It has particular utility in positioning systems used by the armed forces for artillery surveying and positioning and related purposes, and it is well suited for positioning an aircraft in connection with aerial photography.

2. Description of the Prior Art

The conventional approach used in the past for accurate positioning has been to measure two-way ranges from known ground points to an aircraft, and by the method of trilateration determine the aircraft positions. From widely separated aircraft positions, two-way ranges to unknown points are measured and, again through trilateration the unknown positions are determined.

By this approach the measurement of ranges or distances requires the establishment of transmit-receive loops between the aircraft and the base points (coordinates known) and the aircraft and the unknown points. At least two different frequencies, or very complicated multiplexing techniques, are required to overcome the problem of having to transmit and receive at the same time and transmit data and commands simultaneously with rangings. And since many unknown points are involved, the sequencing of transmission is necessary.

The following major difficulties are associated with this approach:

a. Single tunable frequency operation is impossible to achieve except perhaps by employing certain state-of-the-art multiplexing techniques which introduce a great deal of complexity;

b. Because the range measurements do not occur in synchronism (they take place in sequence), adjustments are needed in the solution which must be based on a smooth (usually straight-line) flight of the aircraft. Air turbulance and sudden aircraft maneuvers can cause severe errors;

c. Many "lock-ups", or acquisitions, are required. Each acquisition is a critical and complicated process, with a definite probability of being unsuccessful. Since a large number of acquisitions is involved, the overall probability of system success and reliability is low;

d. The internal signal delay has to be known for each transceiver in the system. The delay in each transceiver including the antenna and cable, has to be measured periodically, and for a tunable system this has to be done at different frequencies.

A technique presently used for positioning is the so-called Range Difference Method, which is also referred to as the Hyperbolic Method. The Range Difference Method is commonly known to most people in the field of positioning and navigation as a method whereby signals are transmitted simultaneously from three or more points, and the difference in the arrival time is measured at the unknown point. These differences define hyperbolas and the unknown point is found at the point of intersection of the hyperbolas.

The Range Difference Method is limited to the use of fixed known points as references, and since fixed points are not available above the surface of the earth, the method is restricted to the use of ground reference points. The use of ground reference points, in turn, restricts the positioning capability to the x-y, or horizontal, plane only, and restricts transmissions to the use of ground waves rather than direct waves. And since the transmission delay of ground waves is affected by the terrain over which they travel, the overall accuracy of positioning is unsatisfactory for certain applications.

The Range Difference Method, because it depends on ground wave propagation, requires long wavelengths and very large antenna installations. This does not permit system mobility, and the large fixed installations are easy targets for enemy actions in military applications.

A third well-known technique is the so-called range-rate or Doppler measurement technique, where a continuous signal is transmitted from a satellite and the unknown position is determined with respect to known satellite positions by measuring the frequency shift, due to the Doppler effect, of the received signal. The satellite positions are determined by a separate positioning system and are transmitted to the unknown positions from the satellite.

The Doppler technique although well suited for determining the positions of ships, is not satisfactory for determining positions on a terrain where altitude is variable, because the Doppler satellite's own instantaneous altitude, being subject to gravity-induced variations, cannot be determined very accurately. Another disadvantage of the Doppler technique is that the signal from the satellite must be received continuously; even a very brief loss of signal causes considerably reduced accuracy or a complete failure of positioning. The Dopper system offers no jam resistance. And the Doppler technique is not adaptable for use with fixed reference points, nor is it not suitable for use with slowly moving aircraft or low carrier frequencies.

All the above difficulties are eliminated and additional advantages are gained by using the Range Change Method (RCM) of locating positions.

SUMMARY OF THE INVENTION

The RCM is based on the following principle:

Given an object which is moving and whose position is known at several points along its path, and given the information as to how much closer to or how much farther away from an unknown point this object moved, one can compute the location of the unknown point.

For example, as an aircraft moves from one point to another it comes closer to, or goes farther away from, any unknown point. The distances it comes closer to, or goes farther away, from the initial observation point are known as Range Changes (RC). When several RC are obtained along the path, the location of the unknown point is defined. There is only one point where all the RC, when added to or substracted from a constant length will converge, and this point is the unknown point.

The initial observation establishes a constant distance which can be interpreted as the radius of a circle around the unknown point. The RC are nothing more than indications of how far the moving object deviated from the constant distance, or the circle. The RC in combination with the known aircraft points define the circle. Once the circle, or even a sector of the circle is defined, the unknown point which lies in the center of the circle is determined.

Thus far we have dealt with positioning or locating a point on a surface. This is the two-dimensional case. The basic principle of the RCM, however, applies similarly to positioning a point in space, or to the three-dimensional case. Then, instead of looking at the RC as defining a circle, one must look at the RC as defining a sphere with the unknown point in the center having coordinates in X, Y, and Z planes. The three-dimensional case is of main interest in this invention. The two-dimensional case is used mainly to simplify the explanations.

Also, thus far we have simply assumed that the coordinates of the points on the path of the moving object were given. In reality these points would also be determined by the RCM. Only three known, or reference, points on the ground need to be given. These points would supply coordinate references for relating the determined positions to map or geographic coordinates. RC will be measured simultaneously at known and unknown points. All the measurements can then be placed into a set of simultaneous equations and solved for the unknown position by a computer.

However, base or reference points are not needed at all in applications where certain points are to be positioned with respect to some other points without having to relate any of the points to map or geographic coordinates. Range changes which are measured simultaneously at all points will provide the relative position information.

Thus, distances between a multitude of different points can be obtained in one mission. It becomes possible to position targets with respect to guns and their azimuth reference points (prominent landmarks, also positioned with respect to the other points), patrols with respect to home base, positions of ships at sea with respect to each other, etc.

To accomplish a position-determination mission an aircraft with a special transceiver (transmitter-receiver) is flown along the side or directly over the area where a number of unknown points are to be positioned. The transmitter in the aircraft transmits a signal which is modulated with a pseudorandom code. The transmitter has a clock and code combination which forms the "yardstick" for measurements. A very stable oscillator is used so the "yardstick" will not stretch or compress.

Ground transceivers which are identical to each other are set up at unknown points, and also at three or more known points (coordinates given) if it is desired to relate the results to map grid or geographic coordinates. All receivers acquire and track the aircraft signal. A tracking code in each receiver, identical to the aircraft code, is kept in precise synchronization with the received coded signal by the use of a correlation detection technique.

Each ground receiver contains a reference counter which may be visualized as a reference code. This counter is of the same length (repeats at exactly the same intervals, has the same number of stages) as the aircraft code. It is driven, or clocked, from a separate, very stable oscillator which has exactly the same frequency as the oscillator in the aircraft. Therefore, except for errors caused in the initial setting of frequency or by oscillator instabilities, the code in the aircraft and the reference counters in all receivers will be running at the same speed, retaining the same position relative to each other.

The tracking code follows the aircraft movements and the reference counter serves as a datum or reference against which the aircraft movements are observed. Thus, for example, if the aircraft were to fly a circular path around the unknown point, it would not be coming closer or moving farther away. In this unusual case the tracking code would stay lined up with the reference counter. But whenever the aircraft deviates from the circular path, comes closer or moves farther away from the receiver at the unknown point, a shift in the phase of the received signal takes place which causes the tracking code to shift with respect to the reference counter. The more the aircraft moves, the more the tracking code shifts. The tracking code, in effect, keeps track of how far the aircraft has moved from the circular path, and this information is continuously available in the form of the amount of shift between the tracking code and the reference counter.

Range changes are obtained simply by reading out the amount of offset between the tracking code and the reference counter. Since this information is continuously available, the readouts could be as frequent as is desired. Three or four readouts along the aircraft path will provide all the information needed for positioning, but a larger number of readouts will improve the accuracy by providing redundant information which is helpful in eliminating errors.

The readouts are controlled and initiated by a readout command received from the aircraft in the form of a data word which is superimposed on the code in the form of code inversions (sequence inversion keying, SIK). Since all ground stations receive the same readout commands, all readouts will correspond to common aircraft positions. It is important to understand that, although the readouts do not occur at the same absolute time because of the different distances and signal delays between the aircraft transmitter and the various receivers on the ground, they do correspond to common points on the aircraft path.

The range change readouts are transferred into a storage device incorporating a magnetic tape, card, cylinder, or magnetic cores. The memory requirements are simplified because a serial, rather than a random access memory is required. At the end of the ranging phase the readouts, along with other data, are transmitted to the computer facility via the aircraft. A transmitter is incorporated into each ground transceiver for this purpose. The data transmissions take place sequentially, each ground transceiver transmitting in a predetermined time slot.

In the Range Change Method all ground stations read out the range changes in synchronism, that is corresponding to common points on the aircraft path (no interpolating). This fact combined with the fact that all ground points are stationary permits the establishment of simultaneous equations from which the ground as well as aircraft positions are computed.

Thus, very accurate aircraft positioning is possible with the RCM. This positioning capability, however, is not the same as the real-time or even near-real-time tracking. Aircraft positions are available only at the end of the mission, after all the data have been collected and processed.

Real-time positioning or tracking, is possible with the RCM from one known point on the ground if the aircraft is flying at constant velocity and its altitude, heading and initial position are known. The initial position needs to be known roughly as being to the north or south, or to the east or west of the known point. Then, tracking could be accomplished, for example, by placing the Control Station, which includes the computer and a transceiver, over a known point and taking range change measurements and feeding them directly into the computer. Appropriately programmed, the computer could determine and print out or graphically display the aircraft position after each measurement.

This technique is severely geometry-limited and is not expected to produce very accurate results. Some improvement appears possible if one-way ranges were measured at the Control Station. This requires that one of the measurements — perhaps the first one — be performed with the aircraft at a known distance from the Control Station. A considerable improvement will result, however, when additional widely separated tracking stations are used and every measurement obtained at those stations is immediately transmitted to the computer facility. But this imposes the requirement for data links, either radio or wire transmission type, between each tracking station and the computer facility.

The speed of response, or the delay between the time the position was displayed and the time the aircraft actually was at that position, is governed by the various delays in the transmission of the signals and the speed of the computations. The accuracy of the aircraft position determination, however, depends on the number of ground positions employed, the geometry, and the method of computation, besides other factors such as the speed of the aircraft, signal-to-noise conditions, etc.

It is pointed out that there is a definite difference between the Range Change Method and the so-called Range Difference Method. The term Range Change was chosen specifically to distinguish the two methods.

In the Range Change Method there is no subtraction of ranges involved. The RCM is based on periodic observations of range after the establishment of a reference range. The range is viewed, or measured, always with respect to the same established reference. In effect, one can view the measurements as one-way ranges with a constant ambiguity, the reference range in the RCM being similar to an ambiguity in a two-way ranging system.

One can convert the results of the RCM so that they become very similar to the hyperbolic methods, and even to the so-called Doppler methods, by subtracting from each range change the preceding value of range change. The results of this conversion can be viewed as range differences, which, of course, are obtained not as a difference of the delays of two simultaneously transmitted signals, but as a difference in the arrival time of the same signal which is transmitted first from one point and later from another point.

It is significant to note that although the RCM results can be converted into range difference results by performing a series of simple subtractions, this would be an unwise thing to do. One would defeat the accuracy advantage of the RCM over the Range Difference Method. In the RCM all measurements are referenced to a common datum (very stable reference oscillator) and, as a consequence, there is a certain correlation in errors; that is, certain errors are cancelled out. In the RCM the data are based on, and measurements are performed on a single one-way signal only. This means that one deals with only one receiver and one range tracking loop which are sources of noise, and with only one air link which is subject to errors. However, when one subtracts one measurement from another, or uses two separate signal sources and paths for each measurement as in the Range Difference Method, he deals with two error sources. The random errors attributed to each measurement do not cancel; actually, the variances add. The result has an uncertainty, or error, which is approximately 1.4 times greater than that of the individual measurements.

In the RCM the stability of the oscillator is of great importance. The short-term random phase jitter of the oscillator is desired to be less than one or two meters equivalent range, or better than 1 part in $10^{11}$ over averaging periods between 10 seconds and 20 minutes. Oscillators meeting this requirement are now available.

The oscillator frequency drift and offset are not critical because they are predictable, or observable in the great redundancy of data. Also note that in the RCM the oscillators need to be stable only over the period required for the ranging phase. This may be between 10 and 30 minutes. Oscillator drift over this period is usually negligible.

Other distinguishing features of the RCM, especially in comparison with one-way ranging systems are:

1. There is no requirement for synchronization of clocks.

2. Bias errors, such as the equipment internal delay calibration errors, and other constant errors do not appear because only changes, rather than absolute values, are measured.

3. Random errors are reduced by the fact that there is a great redundancy of data in the form of a large number of independent range change readouts.

The accuracy of the RCM results can be further increased by various techniques to qualify it for use in any high-accuracy position-determining or distance-measuring application. The accuracy can be increased by increasing the number of range change readouts per aircraft path, by flying many missions using the same ground points, by placing several receivers on the same point and averaging the readouts, and by choosing flight paths which give the optimum geometry. More accurate reference oscillators could be used for precise surveying. The qualities of crystal oscillators have been steadily improving but if crystal oscillators are not good enough, for ultra-precise surveying one can use rubidium vapor or cesium beam frequency sources and completely eliminate the errors due to oscillator instability. Inertial augmentation will greatly improve the real-time tracking accuracy. And improvements in computer programming, as more experience and expertise is gained, are expected to improve the accuracy of the results and provide greater flexibilities in operations.

It is important to note that the above enhancements and accuracy improvements can be achieved without changes in the basic hardware or configuration. This means that a system based on the RCM is resistant to obsolescence.

Accordingly, it is the principal object of this invention to provide a method and a self-contained mobile system for accurately determining the locations of a multitude of unknown positions, including the positions of a moving object such as an aircraft, either relative to arbitrarily chosen ground positions using an assumed system of coordinates, or relative to a given set of known ground positions using geographic or map grid coordinates.

It is another major object of the invention to provide a system which is flexible in its applications and can be used interchangeably with aircrafts, satellites or fixed ground reference points.

It is a further object of the invention to provide a system for determining positions where the unknown ground stations can remain completely passive.

It is a still further object of the invention to provide a position-determining method where the number of unknown positions which can be determined in one mission is quite large.

It is another object of this invention to provide a method and a system for determining positions by using a single band of frequencies which may be tunable.

It is another object of the invention to provide a system for determining positions where equipment calibrations are minimized and no internal delay calibrations are required.

A further object of the invention is to provide a system for determining positions where ranging signals are reliable and cannot be easily jammed, and where a temporary signal loss due to obstructions in signal path will not prevent positioning nor greatly affect the accuracy of positioning.

It is a further object of the invention to provide a method for determining unknown positions where the accuracy of positioning is not affected by erratic movements of the aircraft due to air turbulance, or movements of the satellite due to gravity phenomena, and the speed of the aircraft is not restricted by the number of positions to be determined, and the aircraft path is not limited to straight lines.

It is still a further object of the invention to employ the range change technique to determine the real-time and near-real-time position of objects above the surface of the earth for the purposes of tracking or navigating.

DESCRIPTION OF THE PREFERRED EMBODIMENT

Figure 1:
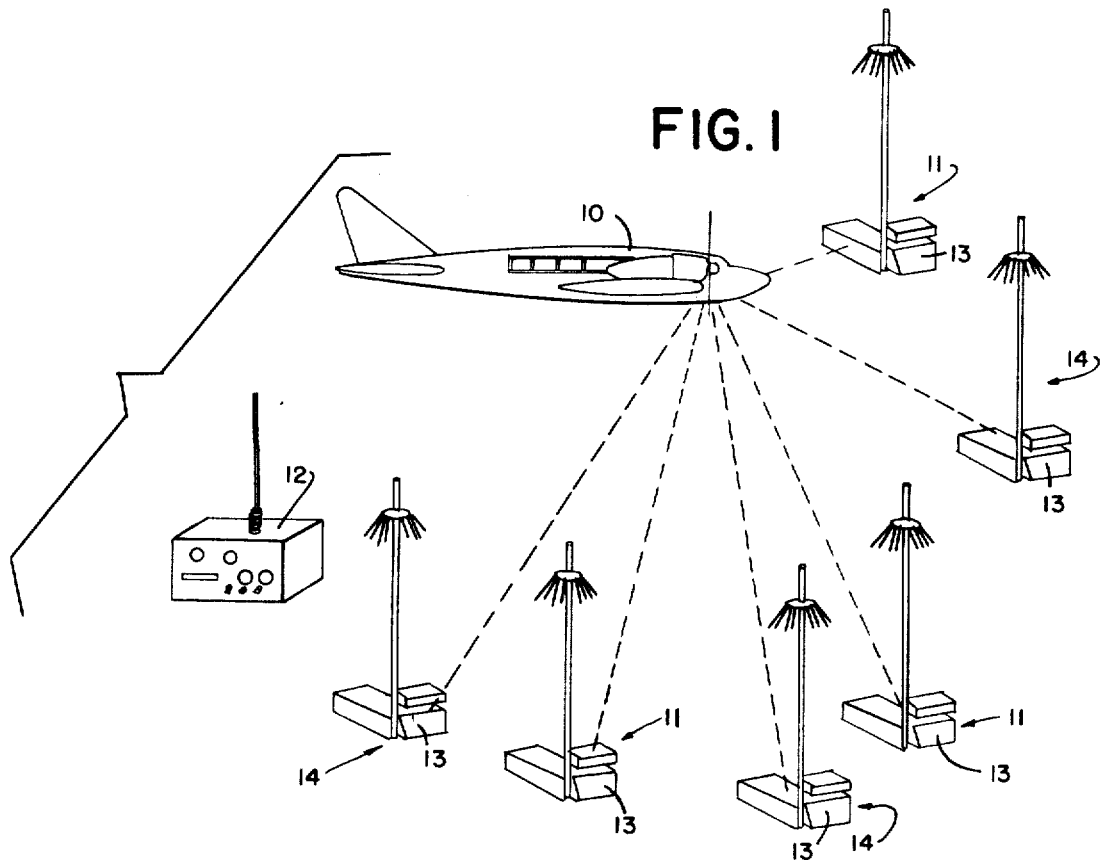
FIG. 1 broadly illustrates the range change system.

Referring to FIG. 1, an aircraft 10 with a special receiver-transmitter (transceiver) flies along the side or directly over the area where a number of unknown points 11 are to be positioned. The transmitter 12 in the aircraft 10 continuously transmits a signal which is modulated with a pseudorandom code.

Special transceivers 13 which are all identical to each other are set up at unknown points 11, and also at three known points 14 (coordinates given) if it is desired to relate the results to map or geographic coordinates. All receivers 13 acquire and track the aircraft signal. A tracking code, identical to the aircraft code, in each receiver 13 is kept in precise synchronism with the received coded signal by the use of a correlation detection technique.

The receivers 13 also contain a reference code. (Note that the reference code need not be a pseudorandom code. It may consist of a simple counter of the same length as the tracking code. But in the following explanations we shall refer to it as the reference code.) This reference code is driven, or clocked, from a separate stable reference oscillator. The reference oscillator is of exactly the same frequency as the oscillator which drives the aircraft code. And ignoring for a moment the errors in the initial setting of frequency and the drifts in frequency, the code in the aircraft 10 and the reference codes in all receivers will be running at the same identical speed, retaining the same position relative to each other.

If the aircraft 10 were to fly a circular path around one unknown point 11, it would not be coming closer or moving farther away. In this unusual case the tracking code would stay lined up with the reference code. The two codes would stay in the same position relative to each other as they were at the beginning of the mission. But whenever the aircraft 10 deviates from the circular path, comes closer or moves farther away from the receiver 13 at the unknown point 11, there occurs a shift in the phase of the received signal which causes the tracking code to shift with respect to the reference code. The more the aircraft 10 moves, the more the tracking code shifts. The tracking code in effect, keeps track of how far the aircraft has moved from the circular path, and this information is continuously available in the form of the amount of shift between the tracking and reference codes.

Range changes are obtained simply by reading out the amount of offset between the tracking and the reference code. Since this information is continuously available, the readouts could be as frequent as is desired. Three or four readouts along the aircraft path will provide all the information needed for positioning, but a larger number of readouts will improve the accuracy by providing redundant information which is helpful in eliminating errors. The readouts are controlled and initiated by a readout command from the transmitter in the aircraft. A certain signal superimposed on the code at the aircraft 10 (data bit or word) triggers the readouts. All receivers 13 are triggered to readout at the instant this signal, consisting of a data bit or word, is received. Thus, all readouts will correspond to common aircraft positions. It is important to understand that although the readouts may not occur at the same absolute time because of the different distances and signal delays between the aircraft transmitter and the various receivers on the ground, the range changes correspond to common points on the aircraft path. Further details on range change readouts are described hereinafter.

The range change readouts are first displayed and then transferred into a storage device such as an array of magnetic cores. The operator can observe the range changes before they are transferred to storage and copy them if necessary. This feature permits the transmission of data, in emergencies or when completely passive operation is required, by messenger, mail or teletype; even by a carrier pigeon. The storage device could be a plug-in unit which could be expanded as required for a larger number of readouts. Also, the plug-in feature could be utilized for the purpose of taking the memory unit to the computer facility for readout. Both of these features would be useful in testing and trouble-shooting.

When the aircraft 10 has completed its pass, or whenever the aircraft tracking portion of the mission is completed, the system changes into the data collection phase. This change-over is pre-programmed to occur at a certain instant of time; for example, automatically after a certain number of code frames of tracking has been completed. The change-over is initiated by a coded message from the aircraft 10, or by switching the aircraft transmitter from the coded transmission to a sine-wave (CW) transmission for short periods, or by using some other technique.

When the data collection phase has been initiated, the aircraft transmitter 12 turns itself off. Now the transmitters 13 at the unknown points 11 (and also at the known points 14, if desired) start transmitting to the aircraft 10 the collected range changes, and other data which may have been entered into a digital message entry device.

The sequence in which the ground transmitters 13 turn themselves on for the transmission of data is controlled by the reference code or counter. Since the aircraft transmitter 12 has been turned off, the tracking code is "free-wheeling" (or it may be locked to the reference oscillator). But the reference codes at the ground transceiver are still running in exact synchronism, except for small deviations caused by different aircraft to ground point delays and clock drifts. These deviations, however, are within a few milliseconds and are negligible as far as the timing and sequencing of transmissions is concerned.

A data transmission is initiated at a particular ground station whenever an assigned slot appears in the data programmer which is clocked by the reference code or counter. Each ground station is assigned a different slot. The slots may be 10–30 seconds wide, depending on how many range changes are collected and what amount of redundancy and reliability in transmission is considered necessary.

The data are transmitted as a digital modulation which is superimposed on the pseudorandom code modulation. The code used in the transmission could be derived from the tracking code generator. The aircraft receiver 12 synchronizes (searches out and acquires) to this coded signal. The data are detected and placed in temporary storage in an array of magnetic cores, a magnetic tape unit, or some other data storage facility. When the data have been collected from all ground stations, the aircraft transmitter 12 turns itself on for the transmission of the contents of the aircraft data storage facility to the computer facility. The receiver at the computer facility, not shown, searches out and locks to the coded signal transmitted from the aircraft, detects the data and transfers them to the computer. Alternately, the aircraft data storage device could be physically transported to the computer facility (even air-dropped) and the data read directly into the computer.

The positions of the unknown points are computed from the range change data measured at the unknown points and at three or more known points. The known points establish a coordinate reference, and all unknown points are positioned with respect to this reference. The coordinates of the unknown points, as well as other data, are printed out at a control station. The aircraft positions corresponding to the transmissions of the range change readout commands could be printed out at the option of the computer operator.

The computer assembles all the messages which are to be transmitted to the ground receivers 13. Each message is preceded with an identification code for addressing the particular ground receiver 13 for which the message is intended.

The system is off-the-air during the computations, but all receivers 13, including the one in the aircraft 10, are in the listening and signal search mode. As soon as the messages are ready for transmission, the transmitter at the computer facility is turned on and it starts transmitting the coded signal. The aircraft receiver 12 acquires this signal. A certain period, perhaps 10 seconds, is allowed for the acquisition.

The data are transmitted to the aircraft 10. The aircraft receiver 12 detects the data and places them in storage. When the data transmission is completed, the transmitter at the computer facility is turned off. The aircraft transmitter 12 is turned on. Approximately 10 seconds is allowed for the ground receivers 13 to acquire the aircraft signal. The aircraft 10 starts transmitting the messages from its storage unit. All ground receivers 13 receive and detect the messages, but a particular receiver 13 will display a message only when it is preceded by its identification code or address. The display could consist of small light-emitting semiconductor devices, which display a message in decimal characters, or possibly in alphanumeric characters.

An alternate approach, which would do away with the need to transmit an identification code, is to use a time slot arrangement similar to that used in the data collection phase. Aircraft message transmissions would be arranged so that each message would be transmitted in a proper time slot. The time slots, again, would be controlled by the reference codes which are still in synchronism (precisely enough to meet the time slot requirements) or are resynchronized at the beginning of the aircraft transmission. Then, each ground receiver would accept and display only that message which is received during the assigned time slot.

There are several choices available in the methematics of computing unknown positions from the measured range changes. First, there is the choice between the circular or hyperbolic approach. Secondly, there is the choice between sequential (incremental, iterative) or simultaneous solution or computational procedure.

As was explained, there are disadvantages in using the hyperbolic approach. The circular approach, therefore, is most appropriate for the writing of the basic observation equations.

The choice between the sequential or simultaneous computational procedure depends on the availability of the data. When the data are available at the computer after each range change measurement, as should be the case in the near-real-time tracking, the sequential solution would be appropriate. In the sequential solution the procedure would be to make an initial estimate of the unknown position, and update and improve this estimate with each new set of range changes. State variables and Kalman filtering could be used in this approach.

In the normal application, however, the data will not be available until the end of the data collection phase, and then the data will be available all at once. The sequential computational procedure could still be used; one could still take just one set of range changes, corresponding to one aircraft position, compute the unknown position, then take another set of range changes, corresponding to the next air position, compute the unknown position, etc. But since all the data are available at once, it is not really necessary, and it may not even be advantageous, to use the sequential approach. Now one can use the simultaneous approach.

In the simultaneous approach all the data would be used at the same time in the solution of simultaneous equations. The number of simultaneous equations could be quite large, depending on the number of ground stations and the number of range change readouts per mission. For example, with 30 ground stations and 40 readouts (40 air positions) one would have 1,200 equations. Using a large memory high speed computer, one could solve all these equations simultaneously. But in field operations using a small computer, it appears more reasonable to solve the equations in two or more batches. First, one could solve all the base station and a limited number of nearby unknown station equations simultaneously. The air position coordinates could be obtained at this stage. (Note that the nearby unknown station data will strengthen the air position results, whereas the far away station data might degrade them.) Next, one could solve the rest of the equations.

Figure 2:
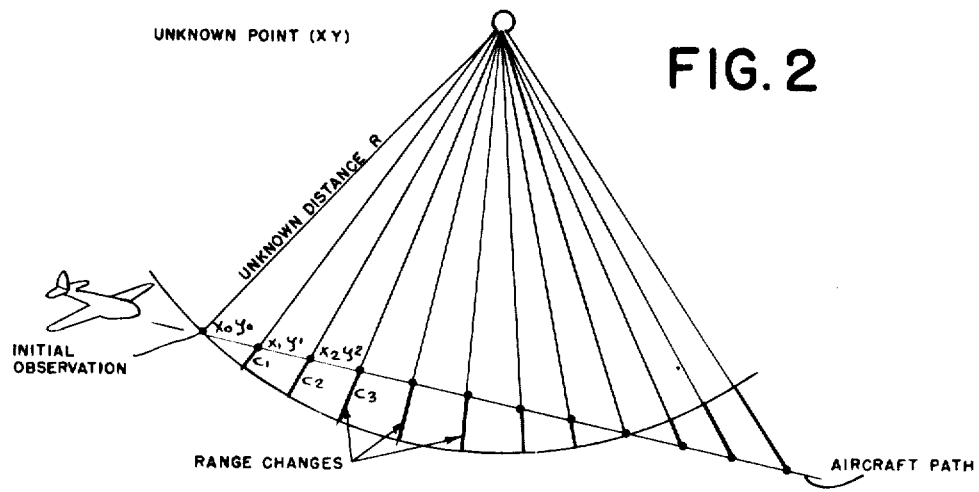
FIG. 2 illustrates the concept of the range change method.

The simultaneous approach is chosen here for explaining the basic mathematical principles used in determining positions by the Range Change Method (RCM). For simplicity, the following explanations and equations are restricted to the two-dimensional case. Note that in the three-dimensional solution the $z$-coordinate would be added. Refer to FIG. 2.

Let us assume at this time that the aircraft position, designated by small $x$ and $y$ are given or have been computed previously. The range changes, designated by the letter $c$ are measured. (Also, the sign of $c$, or the direction of the change in range is read out.) The unknowns are the initial or reference range $R$ and the coordinates $X$ and $Y$ of the unknown point.

The equation of a circle of radius $R$ with center at $X$ and $Y$ is $R^2 = (x_o - X)^2 + (y_o - Y)^2$ This same equation also gives the distance $R$ between any two points with coordinates $(x_0, y_0)$ and $(X,Y)$.

Applying these two concepts, which are based on the same equation, we can write the following set of equations, each corresponding to a different air position:

$R^2 = (x_0 - X)^2 + (y_0 - Y)^2$
$(R - c_1)^2 = (x_1 - X)^2 + (y_1 - Y)^2$
$(R - c_2)^2 = (x_2 - X)^2 + (y_2 - Y)^2$

Note that there are three unknowns: R, X, and Y (unknowns are denoted by capital letters), and we have written three equations. Since there are as many independent equations as there are unknowns, we can solve the equations simultaneously and determine the values of the unknowns. Thus are obtained the coordinates of the unknown point.

In the illustration of FIG. 2 the aircraft was shown flying a straight line. In this case we would obtain two solutions, at mirror image points. In actual practice, however, the aircraft would be flown over an irregular path, and this would result in a singular solution. For example, in FIG. 2 the radial lines including range changes can be rotated around the aircraft path as the axis. An irregular path, however, would not permit this; the whole configuration would be distorted. There is no other point where the radial lines can come to a focus.

If we wanted the three-dimensional coordinates of the unknown point, we would have to include the $z$-coordinates of both the aircraft and unknown point, and would need another equation. This means that, when aircraft positions are given, for computation of the coordinates of unknown points at least two range change measurements are needed for the two-dimensional case and three for the three-dimensional case. Any more than that would provide redundancy.

Redundant measurements, however, are valuable for improving the solution and eliminating errors. Suppose, for example, that we made a slight error in the initial setting of the frequency of the reference clock at the unknown point. This would evidence itself as the stretching or compressing of the reference range R versus time. We would have an error component which we could designate as E. We don't know this error (we assume that we will not check all the frequencies after the mission), but we know that it is proportional to the time elapsed from the start of the ranging phase. Then we could insert this error into our equations and solve for it and eliminate it from the final result. We could write the equations as follows:

$R^2 = (x_o - X)^2 + (y_o - Y)^2$
$(R - c_1 - Et_1)^2 = (x_1 - X)^2 + (y_1 - Y)^2$
$(R - c_2 - Et_2)^2 = (x_2 - X)^2 + (y_2 - Y)^2$
$(R - c_3 - Et_3)^2 = (x_3 - X)^2 + (y_3 - y)^2$

The term E is the frequency error. The terms $t_1$, $t_2$ and $t_3$ represent the intervals between the range change measurement; they are known.

Other error terms could be inserted into the equations and eliminated from the results. An extra equation is needed for each error term. But even with three or four error terms, there would be only seven or eight unknowns. With 40 range change measurements there would be 41 equations; this would still leave 33 redundant equations $(41 - 8 = 33)$.

In the above we looked at the situation where the aircraft positions had somehow been previously determined. This, of course could have been achieved by using a separate positioning, or tracking system just for determining the aircraft position. But this is not necessary. The same method, the RCM, can be used for positioning the aircraft. We only need to place the equipment which measures range changes on additional three or more geometrically favorable known points and take range change measurements simultaneously at all points, both known and unknown. As before, after taking a certain number of range change measurements, there will be more equations than unknowns, and we can solve for all the unknown terms. Thus, aircraft coordinates can be found at the same time as we are determining the coordinates of the unknown ground points.

Note that in the two-dimensional case, with four fixed ground points, every readout command introduces four range changes and subsequently, four more equations, but only two new unknown terms are introduced. The unknown terms are the X and Y coordinates of the new air position. Although initially there are many unknowns, including ground as well as air position coordinates, eventually, after taking enough range change measurements, the number of equations exceeds the number of unknowns and we can obtain a solution. This is so because the ground points are fixed, their coordinates are entered once, and they remain unchanged throughout the mission.

Even if we do not know the coordinates of any of the ground positions, nor the coordinates of the air positions, we can still determine positions by taking an adequate number of range change measurements at a certain minimum number of ground stations. (This minimum number depends on the requirements for estimating the frequency offset and drift of the oscillators, and other conditions.) However, we need to establish a coordinate system. To establish a three-dimensional coordinate system, all three coordinates of one ground point, the vertical and one horizontal coordinate of a second point, and the vertical coordinate of a third point are estimated or arbitrarily assumed. This means that for positioning a number of unknown points relative to each other, in an arbitrary system of coordinates, there are no base or reference points needed. The RCM has the self-survey capability.

This very important capability is derived from the combination of the following basic features of the invention:

1. Range changes are measured at multiple points.
2. All readouts take place in synchronism.
3. A signal is used which permits continuity from the first readout to the last (e.g. a code of unambiguous length is used).
4. Ground points are stationary throughout the mission.

The single-frequency one-way transmission from the aircraft as the nodal point — the basic characteristic of the RCM — permits the measurements to be performed at multiple stationary ground points, all in synchronism. The use of a long code which is equivalent to a long measuring stick, permits the measurements to be continuous from the first measurement to the last. The continuity of the measurements, in turn, permits the use of a large number of simultaneous equations. The measurements taken at multiple fixed points in synchronism constrain the presence of the aircraft, geometrically speaking, to certain singular points in the air, and the unknown positions to certain singular points on the ground: the points at which all range change observations, or measurements, are in agreement and the simultaneous equations provide a solution. The scale factor is provided by the range change measurements.

In the preceding discussion there was no mention of how close or far apart the range change measurements had to be. One may have been left with the impression that the geometry did not matter with the RCM. This impression, however, is wrong. In reality, every range change measurement has some error in it. The errors may be caused by noise in the receivers, by the atmospheric effects, or just by the fact that there is a limit in the resolution or the precision of the measurements. When this error is added into the range changes and into the equations, one will find out that range changes taken at close intervals do not define the circle (two-dimensional case) very precisely, hence the center of the circle is not well defined. The circle is defined better if the same number of measurements, containing the same error, are taken at wider intervals.

A specific method and design for implementing the range change measurements will now be described. Only that which is pertinent to the invention and the technique of obtaining the range change measurements will be described in detail. The details of signal acquisition and data and message transmission, which can be accomplished by various known techniques, are not described here.

The main objective in the implementation of the RCM and in designing the circuits is to obtain measurements of the amount of movement of a moving object, such as an aircraft, with respect to each ground station. The measurements have to be made in exact unison, or synchronism; that is, the range change (RC) readouts at all ground stations have to correspond to common points on the aircraft path.

An important consideration in the design is the matter of losing lock during the mission. Because of some obstruction in the signal path between the aircraft and a ground station, the ground station may lose the signal temporarily and fall out of lock. This may be caused, for example, by a mountain peak or some tall structure which may be blocking the signal over a short section of the aircraft path. It is very desirable that the ground station obtain lock again and continue measuring the RC when the signal is clear again. The measurements after the occurrence of a temporary loss of lock still have to correspond to common points on the aircraft path.

For the above reasons, each range change measurement, or readout, is initiated from the aircraft by the transmission of a readout command signal, and each readout command includes an identifier. The readout command and identifier consists of a digital word which is superimposed, or modulated, on the code transmitted from the aircraft.

Figure 3:
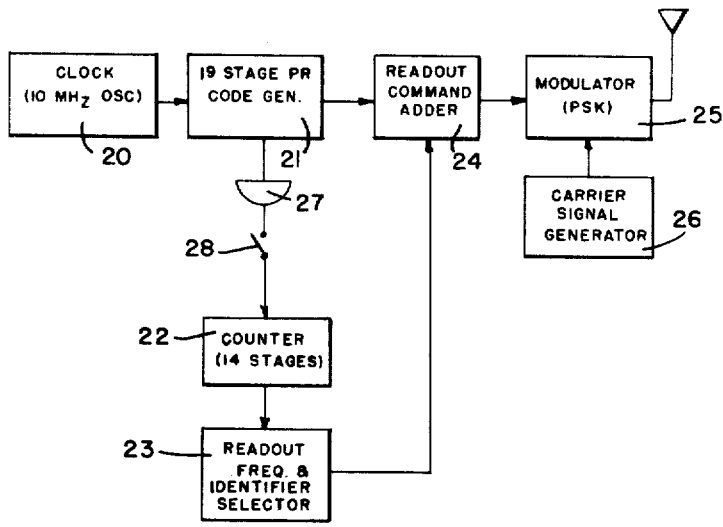
FIG. 3 is a block diagram of the aircraft transmitter.

FIG. 3 shows the basic block diagram of the aircraft transmitter.

A very stable oscillator 20 provides the clock pulses for the code generator 21. The oscillator-code combination forms the yardstick. The oscillator 20 has to be stable so that this yardstick will not stretch or compress.

A clock pulse repetition rate of approximately $10^7$ pulses/sec. is suggested. Higher pulse rates are desirable from the aspect of reducing the multipath effects, but higher pulse rates require more expensive and possibly less reliable digital components, and they also produce a wider spectrum.

For the code a 19-stage pseudorandum linear sequence appears favorable. It is a prime code, long enough to provide a noise-like spectrum and to serve as an unambiguous yardstick (it is 15,700 km long in free space when clocked at $10^7$ pulses/sec.).

The code repeats every 0.0524 sec. If one wanted to read out the range changes at 0.0524 sec. intervals, any one of the code states could be used to initiate a readout. But this would produce a too rapid readout rate. Therefore, a counter 22 is used for providing a more desirable choice of readout rates. The "all ones" state of the code pulses the counter 22, through AND gate 27 and closed condition of switch 28, and when a preselected number of pulses has been counted, the readout command is initiated.

The readout frequency and identifier are determined by 23. The selection of readout frequency is usually made manually prior to the start of a position-determination mission. More specifically, when one wants to have range change readouts at 6.7 sec. intervals (0.0524 sec. $\times 2^7 = 6.7$ sec.), he selects the 7th, 8th, 9th and 10th stages of the counter and uses their outputs for readout commands as well as for readout identifiers. These stages produce binary numbers 0001, 0010, 0011, 0100, etc. at 6.7 sec. intervals. These binary numbers correspond to the decimal numbers 1, 2, 3, 4 etc. Whenever the number changes, a readout command is initiated and the digits in the four stages are transmitted as readout identifiers.

If one wants to double the readout intervals, he simply switches to the 8th, 9th, 10th and 11th stages of the counter, and so on for further increases in readout intervals. Thus, one can easily obtain readout intervals of 6.7, 13.4, 26.8, 53.6 or 107.2 seconds by moving to the next higher set of four counter stages.

The readout commands and identifiers are modulated on the code in the readout command adder 24 by the technique of inverting the code. For example, whenever a data bit "1" appears, the code is inverted; that is, the code sequence stays the same, but the polarity in which the code "1's" and "0's" are transmitted is suddenly changed. This does not affect the receiver's ability to track the code. The inversions, however, can be detected and properly decoded at the receiver.

One could send one or two inversions in the first code frame and these could serve as a readout command as well as a flag that the identification follows. The next four code frames could transmit the four identifier bits. When an inversion occurs in any one of the four frames, it signifies the transmission of a "1". When there is no inversion it signifies the transmission of a "0".

The signal consisting of the code and the readout command and identifier is modulated on the sine-wave carrier by biphase modulation (phase shift keying), using a balanced modulator 25.

Tunability is achieved by using a signal generator 26.

Figure 4:
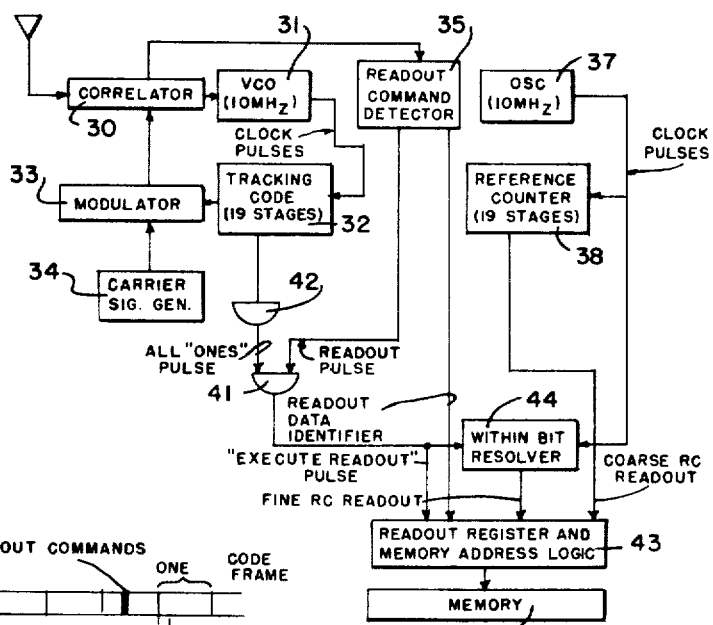
FIG. 4 is a block diagram of a ground receiver.

FIG. 4 shows the basic components of the ground receiver.

The purpose of the correlator 30 is to keep the locally generated code in exact alignment with the code received from the aircraft. A slight deviation from perfect alignment produces an error signal from the correlator 30. It immediately shifts the frequency of the voltage controlled oscillator 31 (VCO) which provides the clock pulses to the code 32. This brings the codes back into alignment again.

The modulator 33 and the carrier signal generator 34 are identical to the modulator 25 and the carrier signal generator 26 in the aircraft.

The readout command detector 35 senses the code inversions. It produces a readout pulse and forms the readout identification numbers which are placed in the memory 40 along with the corresponding range change readouts, or measurements.

The range change readouts are not directly initiated by the readout commands received from the aircraft. When the readout command detector 35 senses a code inversion which represents a readout command, it produces only a gating pulse to the two-input AND gate 41. A range change readout takes place when the next "all ones" state occurs in the tracking code. Thus, the readouts are based on the exact position of the tracking code 32 and do not depend on the readout command pulse shape or processing time. It is presumed here that the readout command is transmitted and detected during one code frame, perhaps in the beginning or in the middle of the frame so that when the "all ones" pulse arrives the AND gate 41 has been enabled with plenty of margin.

The leading edge of the pulse from the 2-input AND gate executes the readout. When this pulse appears, the number which happens to be in the counter at this instant, representing the Course Range Change, is read into a register 43. The readout identifier is also read into the register. And the output from the Within-Bit Resolver 44 which represents the Fine Range Change, is read into the register. The number in the register may be displayed in a binary display (lights), not shown, and immediately before the readout of the next range change the contents of the register is transferred into the memory 40.

Readout command words, which may consist of binary numbers 00000 to 11111 (0 to 31), also serve as readout identifiers for "bookkeeping" purposes. With the identifier attached to each range change measurement, it is possible to associate each measurement with the corresponding air position even after skipping a number of measurements, which may be caused by a temporary loss of signal.

The purpose of the Within-Bit Resolver 44 is to resolve the readouts into increments much smaller than a counter bit. Without the Resolver 44 the resolution of the measurements would be limited to the frequency of the counterclock pulses. But there is a limit how fast the counter and all the associated digital circuits can be clocked and operated. A 1.0 meter resolution or even better is desirable; but to obtain this resolution the counter must be clocked at 300MHz, and this is not within the present state-of-the-art. By employing the Within-Bit Resolver 44, however, one can clock the counter at a reasonable speed to provide reliable operation, yet still obtain high resolution. Better than 0.1 meter resolution appears possible by the use of presently manufactured devices. The Resolver 44 measures the time between the occurrence of the readout pulse and the occurrence of the next clock pulse of the counter 38. The spacing between the readout pulse and the next clock pulse, subtracted from the total spacing between the counter clock pulses, provides the fine readout.

In the description of the operational concept, it was stated that the range changes were obtained simply by reading out the amount of offset between the tracking code and the reference counter. This is correct in principle, but actually the state of the counter is just being read out at the instant a readout command is received. This is the simplest implementation of the basic principle.

The reference oscillator 37 and counter 38 combination produces a code which repeats at the same frequency as the aircraft code. If the aircraft stays at a constant distance from the ground station, the readout pulses occur at exactly equal intervals, and the counter readouts will be identical.

Figure 5:
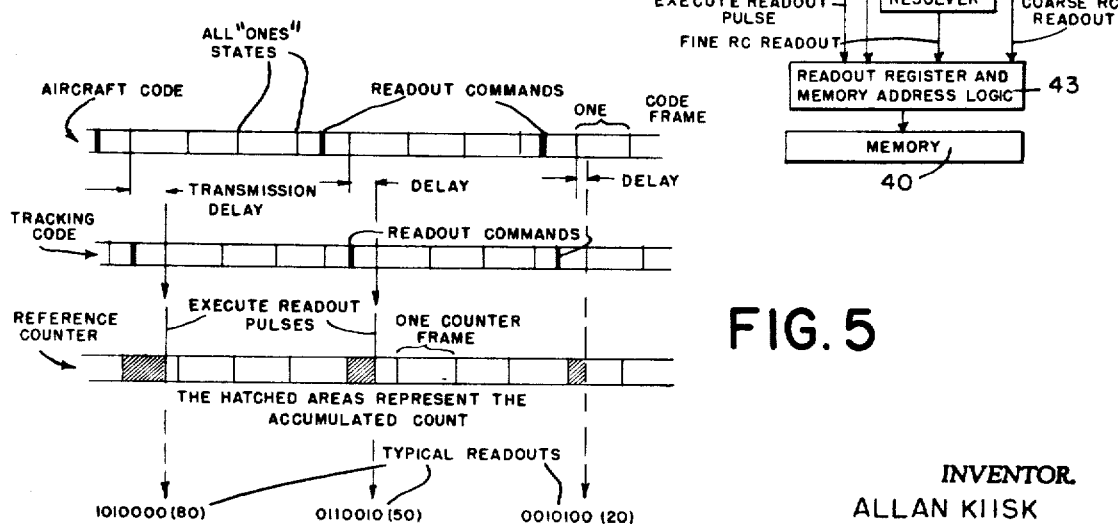
FIG. 5 illustrates the form counter readouts taken with the aircraft coming closer to the ground receiver.

When the aircraft comes closer to the ground receiver, the tracking code shifts. Readout pulses appear at shorter intervals and the counter states which are read out are not identical. This is shown in FIG. 5. This figure shows the relation of the aircraft code pulses, tracking code and reference code pulses and occurrences of typical readout commands as the aircraft comes closer to a ground station.

Note that in FIG. 5 for the rate of simplicity in illustration the readout pulse is shown occurring every four code frames. This corresponds to a readout every 0.2 seconds. In actuality, readouts would be taken at periods of 7 seconds or greater, which corresponds to a readout every 128 or more code frames.

If, in FIG. 5, each counter bit represents 30 meters of range, then it can be seen that the aircraft has advanced 900 meters (30 bits × 30m/bit — 900m) between each range change measurement. And if the initial readout is considered the reference range, then each successive readout, in the amount it differs from the initial readout, represents the range change. If the number which is read out is greater than the initial readout, the aircraft has moved farther away. If it is smaller, the aircraft has come closer. The readouts are converted to distance in meters, on the basis of field calibrations, and from those data the location of the receiver and the unknown point is computed as described previously.

I claim:

1. A method for determining the locations of a plurality of unknown positions relative to each other comprising:
    a. providing means for travel relative to said unknown positions, said means including a first signal generating and transmitting means;
    b. producing in said signal generating means a carrier signal and a first modulating signal whose overall wave-length in air is long in comparison with the distance travelled by said means for travel in any one direction during a determination of unknown positions and having distinct and measurable phase characteristics at all points along the overall wavelength in varying increments;
    c. periodically superimposing on said modulated carrier signal a second modulating signal including readout command signals and readout identifier signals;
    d. providing said unknown positions with signal receiving means, including means for received signal acquisition and tracking and for the generation of a second signal which is identical to the first modulating signal but is delayed in phase in exact proportion to the distance between said means for travel and the unknown point, means for detecting readout commands, means for generating a third signal whose frequency and phase characteristics are in a known relationship to said first modulating signal, means for measuring phase shifts between said second signal and said third signal and means for storage of phase shift measurements data;
    e. providing a central computing means and means for transferring data from all unknown positions to said computing means;
    f. providing computer controlled display means for visual display of computed data;
    g. transmitting said first signal while said means for travel is travelling in the vicinity of said unknown positions;
    h. receiving said first signal and measuring said phase shifts in synchronism at all said unknown positions at the instants of occurrence of said readout commands, said shifts representing range changes of said means for travel relative to said unknown positions;
    i. transferring said measurements from all unknown positions to said computing means;
    j. computing the coordinates of said unknown positions through solution of simultaneous equations, wherein range change measurements are included as terms and establishing a system of orthogonal coordinates by assuming and including in the computations all three coordinates of one unknown position, the vertical and one horizontal coordinate of a second unknown position and the vertical coordinate of a third unknown position; and
    k. displaying the results including the coordinates of each unknown position and the distances between the unknown positions and the azimuth and elevation angles with respect to assumed reference planes.

2. The method as set forth in claim 1 for additionally determining the geographic or map grid coordinates of a plurality of unknown positions, said method further comprising:
    a. providing receiving means additionally at three or more geometrically suitable known positions;
    b. effecting range change measurements at said known positions in synchronism with measurements at unknown positions;
    c. computing solutions of simultaneous equations including range change measurements obtained at said known as well as unknown positions and substituting the coordinates of said known positions in lieu of the assumed coordinates of said three unknown positions; and
    d. displaying the computed results in the coordinate system used for fixing the locations of said known positions.

3. The method as set forth in claim 1 for additionally determining the positions of said means for travel at selected points along its path of travel, said positions being determined relative to said unknown positions whose locations are being simultaneously determined, said method further comprising the step of directing the computing means to additionally display the coordinates of said means for travel corresponding to the instants of occurrence of readout commands, said coordinates obtained upon determination of the unknown position coordinates.

4. The method as set forth in claim 2 for additionally determining the positions of said means for travel at selected points along its path of travel, said positions being determined in geographic or map grid coordinates, said method further comprising the step of directing said computing means to display the coordinates of said means for travel corresponding to the instants of occurrence of readout commands, said coordinates obtained upon determination of the unknown position coordinates.

5. The method of claim 3 wherein said means for travel is an extraterrestrial object.

6. The method of claim 4 wherein said means of travel is an extraterrestrial object.

7. The method as set forth in claim 3 for additionally determining the locations of passive unknown positions relative to other passive and active unknown positions without transfer of data from the passive unknown positions, said method further comprising:
   a. providing said passive unknown positions with means for receiving and processing data and means for computing and displaying position information;
   b. providing said central computing means with means for transmission of data;
   c. transmitting from said central computing means data consisting of the coordinates of said means for travel at selected points along its path of travel, said coordinates determined from range change measurements obtained from at least four unknown positions adapted to transmit measurements to said central computing means; and
   d. receiving and processing said data, transmitted from said central computing means, at said passive unknown positions and computing the coordinates of said passive unknown positions by solving simultaneous equations wherein the coordinates of said means for travel and corresponding range change measurements obtained at said passive unknown stations are used as terms in said equations.

8. The method as set forth in claim 4 for determining the geographic or map grid coordinates of passive unknown positions without transfer of data from the passive unknown positions, said method further comprising the steps of:

a. providing said passive unknown positions with means for receiving and processing data and means for computing and displaying position information;
   b. providing said central computing means with means for transmission of data;
   c. transmitting from said central computing means data consisting of the coordinates of said means for travel at selected points along its path of travel, said coordinates determined from range change measurements obtained at positions adapted to transmit measurements to said central computing means, said positions including at least three known positions; and
   d. receiving and processing said data, transmitted from said central computing means, at said passive unknown positions and computing the coordinates of said positions by solving simultaneous equations wherein the coordinates of said means of travel and corresponding range change measurements obtained at said passive unknown stations are used as terms in said equations.

9. The method as set forth in claim 4 for determining the positions of an extraterrestial object along its path of travel in real time for the purpose of tracking or navigating, said method further comprising the steps of:
   a. providing interconnections between said central computing means and one or more known positions so that each range change measurement obtained at said positions can be immediately transmitted to said computing means;
   b. determining the approximate initial position, altitude, heading and velocity of said extraterrestial object and entering this information into said computing means;
   c. performing range change measurements and immediately transferring said measurements from said one or more known positions to said computing means; and
   d. computing the coordinates and the path of travel of said extraterrestrial object by the use of simultaneous equations in conjunction with the computational technique known as Kalman filtering or estimation and recursive updating.

10. The method as set forth in claim 1 for determining the locations of unknown positions wherein said means for travel is replaced by three or more fixed reference positions as signal sources for range change measurements, all said positions including said first signal generating and transmitting means including means for keeping said first modulating signals of all said fixed reference positions in a known relationship to each other, and means for sequential control of the transmission whereby the effect on the unknown stations that a single signal generating means was transported from one point to another is obtained.

11. A method as set forth in claim 10 for determining the locations of passive unknown positions relative to fixed known positions further comprising the steps of:
   a. establishing the coordinates of said fixed reference positions and making this information available to unknown positions;
   b. providing said unknown positions with local means for computing and displaying position information;
   c. transmitting said first signals in sequence from said fixed reference positions;
   d. receiving said signals and performing range change measurements; and
   e. computing the coordinates of said unknown positions through solution of simultaneous equations wherein range change measurements and the coordinates of said fixed reference positions are included as terms.

12. A system for determining the locations of unknown positions, said system comprising:
   a. a first transceiver located in means for travel above the earth's surface, said transceiver including circuit means for generating a carrier modulated with a code and readout commands and identification signals, and circuit means for receiving and retransmitting data;

b. ground transceivers positioned on at least four locations, at least one of which is an unknown location, each of said ground transceivers having circuit means for receiving and detecting signals from said first transceiver, including means for generating a tracking code, correlation detection means for keeping the tracking code aligned with the code received from said first transceiver, means for generating a reference code clocked by a stable oscillator, phase shift measuring means for determining the shift of said tracking code relative to said reference code at the instant of the reception of a readout command, storage means for retaining the phase shift measurements, and means for transmitting said measurements in preselected time slots to computing means via said first transceiver; and c. computing means including means for receiving and displaying data, said computing means programmed for processing of the phase shift measurements received from all known and unknown positions and for simultaneously solving equations wherein said phase shift measurements are included as terms, said measurements representing range changes with respect to the initial range between said travelling means and the ground stations.

13. A system as defined in claim 12 wherein the transmitter portion of said first transceiver comprises:
   a. a code generating means;
   b. oscillator means connected to and providing stable clock pulses to said code generating means;
   c. means for generating readout command and identifier signals;
   d. means for modulating or adding said command and identifier to said code, the input of said means connected to said code generating means and said means for generating readout command and identifier signals;
   e. carrier signal generating means including means for selecting different carrier frequencies; and
   f. modulator means connected to said carrier signal generating means and to the output of said means for modulating or adding said command and identifier to said code.

14. A system as defined in claim 12 wherein the receiver portion of each of said ground transceivers comprises:
   a. means for generating tracking code signals;
   b. first oscillator means connected to said tracking code signal generating means providing clocked pulses thereto, the frequency of said pulses being controllable by signals from a correlator circuit means;
   c. readout command signal detecting means;
   d. correlator circuit means for synchronizing said tracking code signals with received code signals, said correlator circuit means connected to said readout command detector and to said first oscillator means;
   e. carrier signal generating means;
   f. modulator means connected to said carrier signal generating means, said tracking code generating means and said correlator circuit means;
   g. reference code generating means;
   h. second oscillator means connected to said reference code generating means to provide clocked pulses thereto;
   i. data storage means; and
   j. circuit means for measuring the shift of said tracking code, with respect to said reference code, the input of said means connected to tracking code, reference code and readout command signal detecting means, and the output connected to said data storage means.

15. A system as recited in claim 13 wherein said means for generating readout command and identifier signals comprises counter means whose input is connected to said code generating means for counting the number of code repetitions, said counter stages connected to a readout frequency and identifier selector for selecting the outputs of adjacent groups of 4–6 stages up or down the counter, depending on the desired frequency of readouts, to serve as both readout command and identifier.

16. A system as recited in claim 13 wherein said means for generating readout command and identifier signals comprises counter means whose input is connected to means operated manually or remotely through a relay to produce a pulse whenever the exact position of said means for travel is desired to be known, the outputs of the counter stages, or the states of the counter, serving as both readout command and identifier.

17. A system as recited in claim 14 wherein said first oscillator means is a voltage controlled oscillator.

18. A system as recited in claim 14 wherein said reference code is generated by a counter which is clocked by a stable oscillator of a known frequency relationship to the frequency of the oscillator used as a clock for the code in said first transceiver, and the measurements of phase shift consist of reading out the counter states and the counter clock phase with respect to the tracking code clock phase at the instant of reception of a readout command.

19. A system as recited in claim 14 wherein the circuit means for measuring the shift of said tracking code includes a logic circuit for generating a readout command signal which is not affected by distortions and delays in the detection of the readout command word, said logic circuit comprising:
   a. a first gate whose inputs are connected to the stages of said tracking code generating means so that a short pulse is produced at the rate of the code repetition frequency; and
   b. a second gate whose one input is connected to said first gate and a second input to readout command signal detecting means so that each readout command enables said second gate to produce one output pulse at the instant of occurrence of the pulse at the output of said first gate, said output pulse of said second gate being used to execute a range change measurement.

20. A system as defined in claim 14 wherein said memory or data storage means comprises:
   a. a readout register connected to the output of said circuit means for measuring the shift of said tracking code;
   b. display means connected to said readout register for visual display of the contents of said register; and c. memory means connected to said readout register, said memory means being removable from said ground transceiver for physical transfer of said memory means including stored data to a computing means for readout of data at said computing means.

* * * * *